US009706236B2

(12) United States Patent
Chakarapani

(10) Patent No.: US 9,706,236 B2
(45) Date of Patent: Jul. 11, 2017

(54) AUTOMATIC SUGGESTION FOR SWITCHING BROADCAST MEDIA CONTENT TO ON-DEMAND MEDIA CONTENT

(71) Applicant: Verizon Patent and Licensing Inc., Arlington, VA (US)

(72) Inventor: Lakshmi N. Chakarapani, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 6 days.

(21) Appl. No.: 14/494,254

(22) Filed: Sep. 23, 2014

(65) Prior Publication Data
US 2016/0088334 A1 Mar. 24, 2016

(51) Int. Cl.
*H04N 21/262* (2011.01)
*H04L 29/06* (2006.01)
*H04N 21/234* (2011.01)
*H04N 21/439* (2011.01)
*H04N 21/44* (2011.01)
*H04N 21/472* (2011.01)
*H04N 21/8352* (2011.01)

(52) U.S. Cl.
CPC ... *H04N 21/26241* (2013.01); *H04L 65/4084* (2013.01); *H04N 21/23418* (2013.01); *H04N 21/4394* (2013.01); *H04N 21/44008* (2013.01); *H04N 21/47202* (2013.01); *H04N 21/8352* (2013.01)

(58) Field of Classification Search
CPC ......... H04N 21/26275; H04N 21/4126; H04N 21/47202
See application file for complete search history.

(56) References Cited

U.S. PATENT DOCUMENTS

| | | | |
|---|---|---|---|
| 9,094,730 B1* | 7/2015 | Kirmse | H04N 21/4826 |
| 2003/0229900 A1* | 12/2003 | Reisman | G06F 17/30873 |
| | | | 725/87 |
| 2007/0094692 A1* | 4/2007 | de Heer | H04N 7/17318 |
| | | | 725/87 |
| 2009/0249410 A1* | 10/2009 | Maruyama | H04N 7/17336 |
| | | | 725/88 |
| 2010/0125870 A1* | 5/2010 | Ukawa | H04N 7/17318 |
| | | | 725/32 |
| 2010/0154021 A1* | 6/2010 | Howarter | H04N 21/4126 |
| | | | 725/141 |

(Continued)

*Primary Examiner* — Pinkal R Chokshi
*Assistant Examiner* — Frank Johnson-Calderon

(57) ABSTRACT

A device obtains an on-demand catalog associated with an on-demand media service, a broadcast schedule associated with a broadcast media service, and a status associated with a media client. Based on information contained in the status and information contained in the broadcast schedule, the device identifies a media content being played by the media client using the broadcast media service. Based information contained in the on-demand catalog, the device further identifies an on-demand option for playing the media content using the on-demand media service. The device provides, to the media client, a suggestion, identifying the on-demand option, which permits a user, of the media client, to play the media content using the on-demand media service.

20 Claims, 13 Drawing Sheets

(56) References Cited

U.S. PATENT DOCUMENTS

| | | | |
|---|---|---|---|
| 2011/0214154 A1* | 9/2011 | Nagano | H04N 21/4532 725/87 |
| 2011/0247039 A1* | 10/2011 | Cheng | H04N 5/4403 725/52 |
| 2011/0307930 A1* | 12/2011 | Rouse | H04N 21/2387 725/98 |
| 2012/0117193 A1* | 5/2012 | Phillips | H04W 4/00 709/219 |
| 2012/0147022 A1* | 6/2012 | Roberts | H04N 21/4126 345/540 |
| 2014/0150040 A1* | 5/2014 | Kitahara | H04N 21/4722 725/93 |
| 2014/0215525 A1* | 7/2014 | Jeong | H04N 21/4622 725/46 |
| 2015/0143419 A1* | 5/2015 | Bhagwat | H04N 21/2265 725/37 |

* cited by examiner

| Media ID | Correspondence Index | | | | |
|---|---|---|---|---|---|
| | Broadcast Options | On-Demand Options | | | |
| | | Service 1 | Service 2 | Service 3 | |
| Media 1 | Station 1<br>6pm-7pm time-frame index<br>Medium | service1/media1,pos=?<br>High | | service3/media1,pos=?<br>Medium | |
| Media 2 | Station 1<br>7pm-8pm time-frame index<br>Medium | | service2/media2,pos=?<br>Medium | service3/media2,pos=?<br>Medium | |
| Media 3 | Station 1<br>8pm-9pm time-frame index<br>Medium | | | service3/media3,pos=?<br>Medium | |
| Media 4 | Station 2<br>6pm-7pm time-frame index<br>Medium | service1/media4,pos=?<br>High | | | |
| Media 5 | Station 2<br>7pm-8pm time-frame index<br>Medium | | service2/media5,pos=?<br>Medium | | |
| Media 6 | Station 2<br>8pm-9pm time-frame index<br>Medium | service1/media6,pos=?<br>High | service2/media6,pos=?<br>Medium | | |

FIG. 5E

400
AUTOMATIC SUGGESTION FOR SWITCHING BROADCAST MEDIA CONTENT TO ON-DEMAND MEDIA CONTENT

BACKGROUND

Media clients may have access to various media content through a variety of media providers. Some media providers may broadcast media according to a schedule, while other providers may stream media on-demand. Sometimes, media content broadcast to a media client is also available as an on-demand stream.

BRIEF DESCRIPTION OF THE DRAWINGS

FIGS. 5A-5E are diagrams of an example implementation relating to the example process shown in FIG. 4;

DETAILED DESCRIPTION OF PREFERRED EMBODIMENTS

The following detailed description of example implementations refers to the accompanying drawings. The same reference numbers in different drawings may identify the same or similar elements.

Wide availability of on-demand video and/or audio content may provide a user of a media client with several advantages over broadcast content. For example, on-demand content may be available in higher quality, on more devices, with trick features (e.g., pause, rewind, fast-forward), and/or without commercial interruption. However, the user may not be aware of on-demand options available to the media client and may, thus, choose broadcast content or an inferior on-demand option even though a better on-demand option exists. In doing so, the user's experience may be diminished by media content having poor quality, commercial interruptions, and/or missing content. Implementations described herein may improve the user's experience by providing the media client with a suggestion identifying one or more on-demand options for providing media content to the user.

Figure 1:
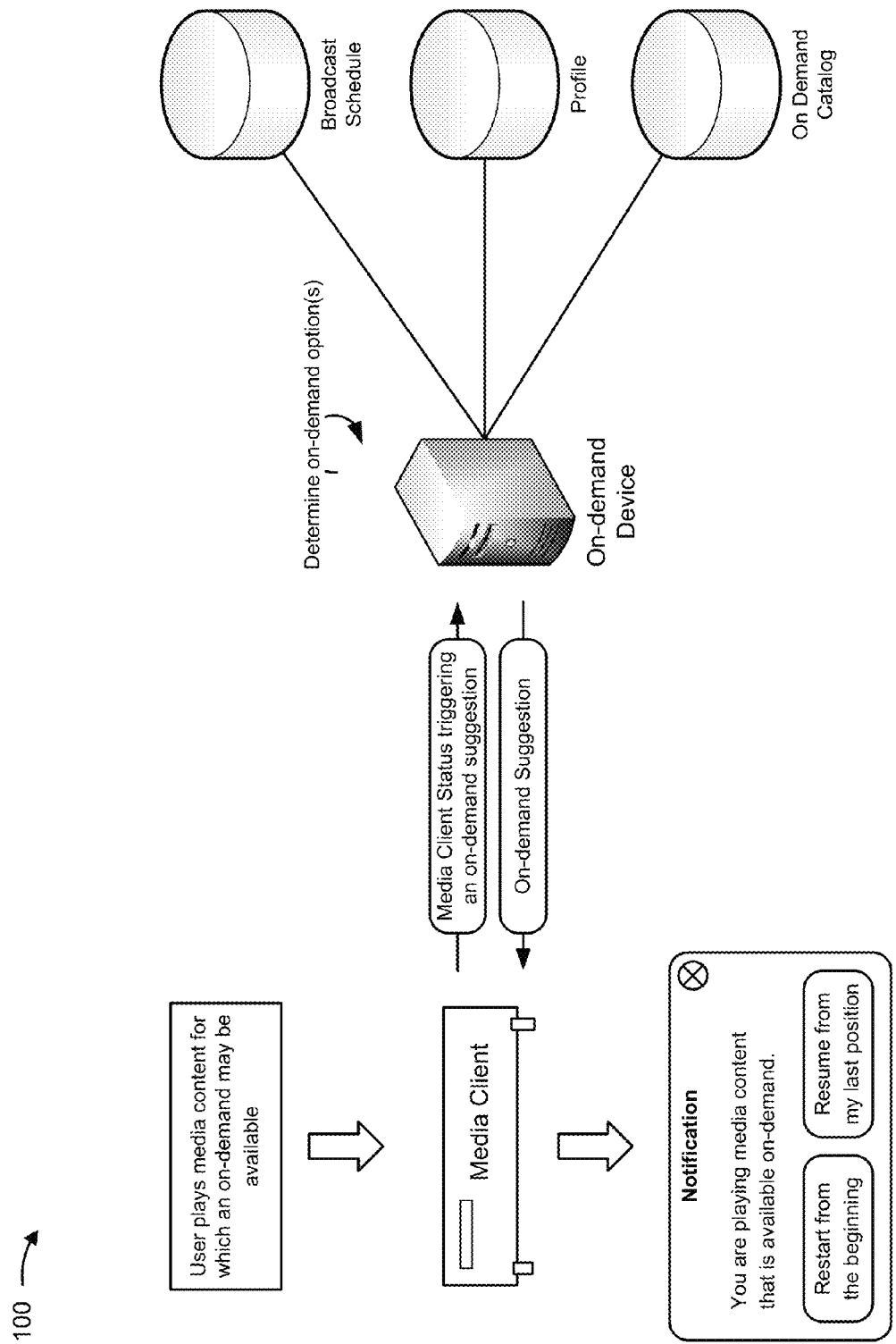
FIG. 1 is a diagram of an overview of an example implementation described herein.

FIG. 1 is a diagram of an overview of an example implementation 100 described herein. In example 100, a user may direct a media client (e.g., a set-top box) to play media content when on-demand may be preferable to the user. The media client may send, to an on-demand device, a status that triggers an on-demand suggestion ("Media Client Status triggering on-demand suggestion"). Based on the status, a broadcast schedule, a profile, and/or an on-demand catalog, the on-demand device may identify the media content, determine options for playing the media content from an on-demand service, and send a suggestion ("On-demand Suggestion"), to the media client, identifying the options to the media client. The media client may likewise provide a notification to the user ("You are playing media content that is available on-demand. Restart from beginning Resume for my last position.") based on the options identified in the on-demand suggestion. In this way, the user may automatically discover on-demand options and/or switch to an on-demand option that matches media content currently being played on a media client.

Figure 2:
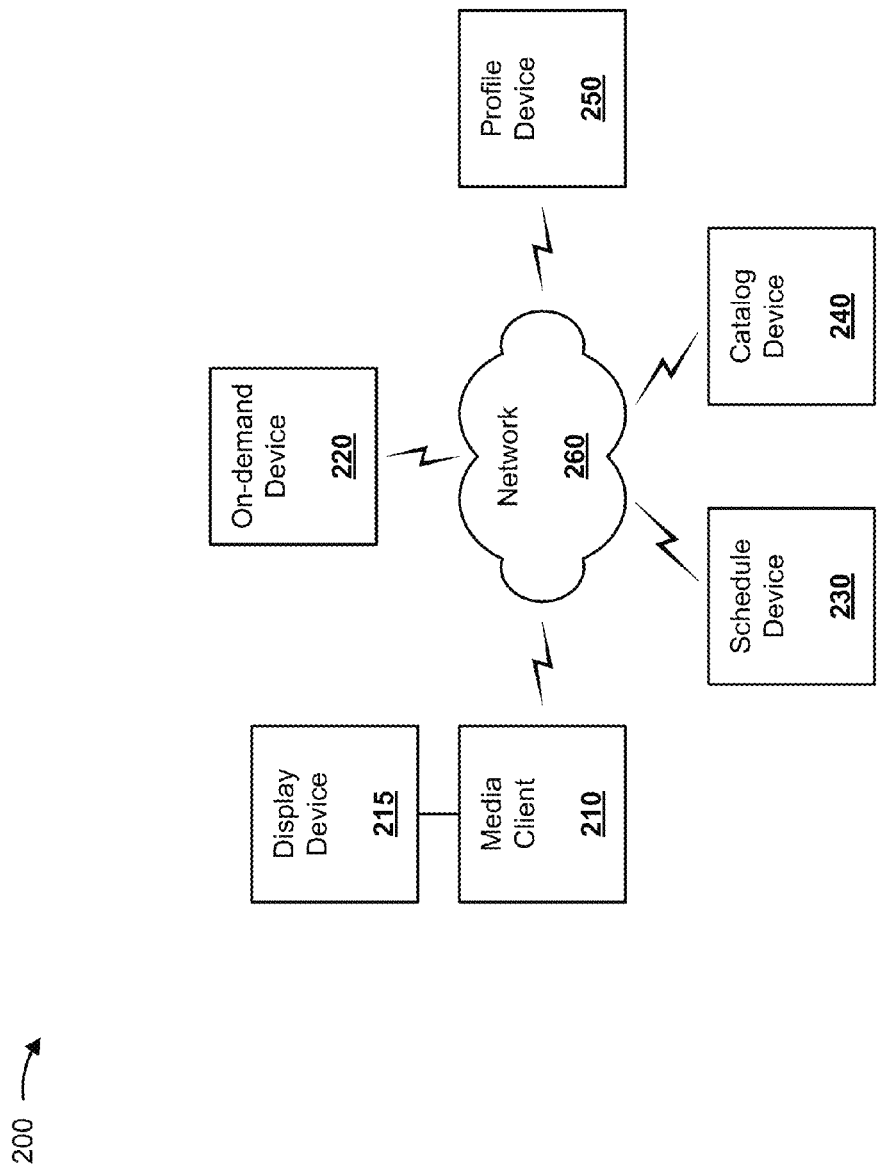
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a media client 210, display device 215, on-demand device 220, schedule device 230, catalog device 240, profile device 250, and/or network 260. Devices of environment 200 may interconnect via wired connections, wireless connections, or a combination of wired and wireless connections.

Media client 210 may include a device capable of receiving, transmitting, and/or processing multimedia content and providing the multimedia content to a user (e.g., via a speaker and/or display device 215). Examples of media client 210 may include a set-top box, a casting stick (e.g., a high-definition media interface (HDMI) dongle), a desktop computer, a laptop computer, a tablet, a mobile phone, a cable card, a gaming device, a portable electronic device, and/or another type of device capable of receiving, transmitting, and/or processing multimedia content and providing the multimedia content to a user. In some implementations, media client 210 may include a communication interface that allows media client 210 to receive information from and/or transmit information to other devices in environment 200. For example, media client 210 may send and/or receive information, associated with providing an on-demand suggestion, to/from on-demand device 220, schedule device 230, catalog device 240, and/or profile device 250.

Display device 215 may include any digital or analog display that is capable of presenting audio and/or video content provided by media client 210. Display device 215 may include a display technology, such as cathode ray tube (CRT) display, liquid crystal display (LCD), light-emitting diode (LED) display, plasma display, etc. Examples of display device 215 may include a television, a projector, a computer monitor, and/or another type of device capable of presenting audio and/or video content.

On-demand device 220 may include one or more devices, capable of storing, processing, and/or routing information, such as a server device or a collection of server devices. In some implementations, on-demand device 220 may include a communication interface that allows on-demand device 220 to receive information from and/or transmit information to other devices in environment 200. For example, on-demand device 220 may send and/or receive information, associated with providing an on-demand suggestion, to/from media client 210, schedule device 230, catalog device 240, and/or profile device 250.

Schedule device 230 may include one or more devices, capable of storing, processing, and/or routing information, such as a server device or a collection of server devices. In some implementations, schedule device 230 may include a communication interface that allows schedule device 230 to receive information from and/or transmit information to other devices in environment 200. For example, schedule device 230 may send and/or receive information, associated with a schedule for broadcast media content, to/from media client 210 and/or on-demand device 220.

Catalog device 240 may include one or more devices, capable of storing, processing, and/or routing information, such as a server device or a collection of server devices. In some implementations, catalog device 240 may include a communication interface that allows catalog device 240 to receive information from and/or transmit information to other devices in environment 200. For example, catalog device 240 may send and/or receive information, associated with a catalog for on-demand media content, to/from media client 210 and/or on-demand device 220.

Profile device 250 may include one or more devices, capable of storing, processing, and/or routing information, such as a server device or a collection of server devices. In some implementations, profile device 250 may include a communication interface that allows profile device 250 to receive information from and/or transmit information to other devices in environment 200. For example, profile device 250 may send and/or receive information, associated with a profile identifying options for providing an on-demand suggestion, to/from media client 210 and/or on-demand device 220.

Network 260 may include one or more wired and/or wireless networks. For example, network 260 may include a cellular network (e.g., an LTE network, a 3G network, a code division multiple access (CDMA) network, etc.), a public land mobile network (PLMN), a local area network (LAN), a wide area network (WAN), a metropolitan area network (MAN), a television network, a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
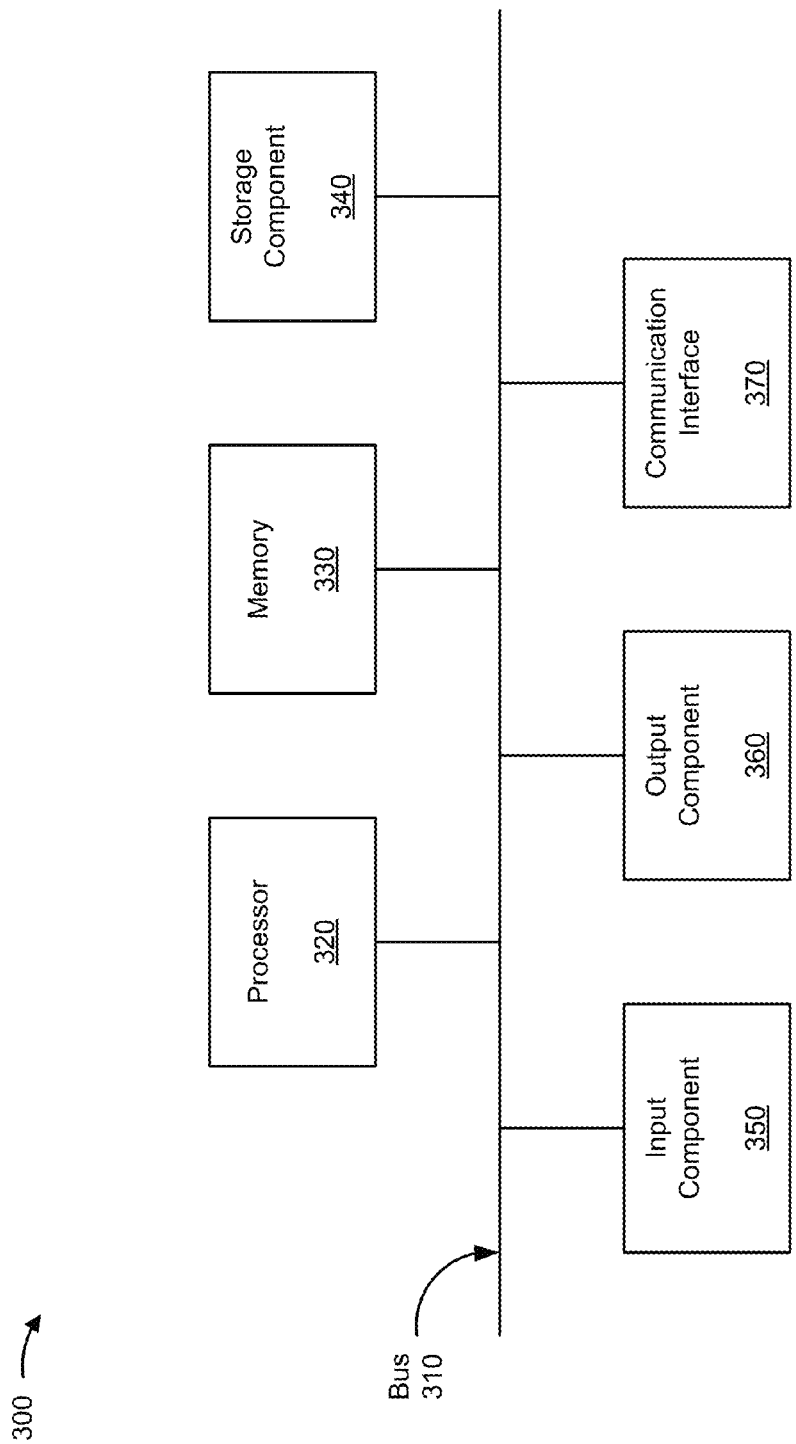
FIG. 3 is a diagram of example components of one or more devices of FIG. 2.

FIG. 3 is a diagram of example components of a device 300. Device 300 may correspond to media client 210, display device 215, on-demand device 220, schedule device 230, catalog device 240, and/or profile device 250. In some implementations, media client 210, display device 215, on-demand device 220, schedule device 230, catalog device 240, and/or profile device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
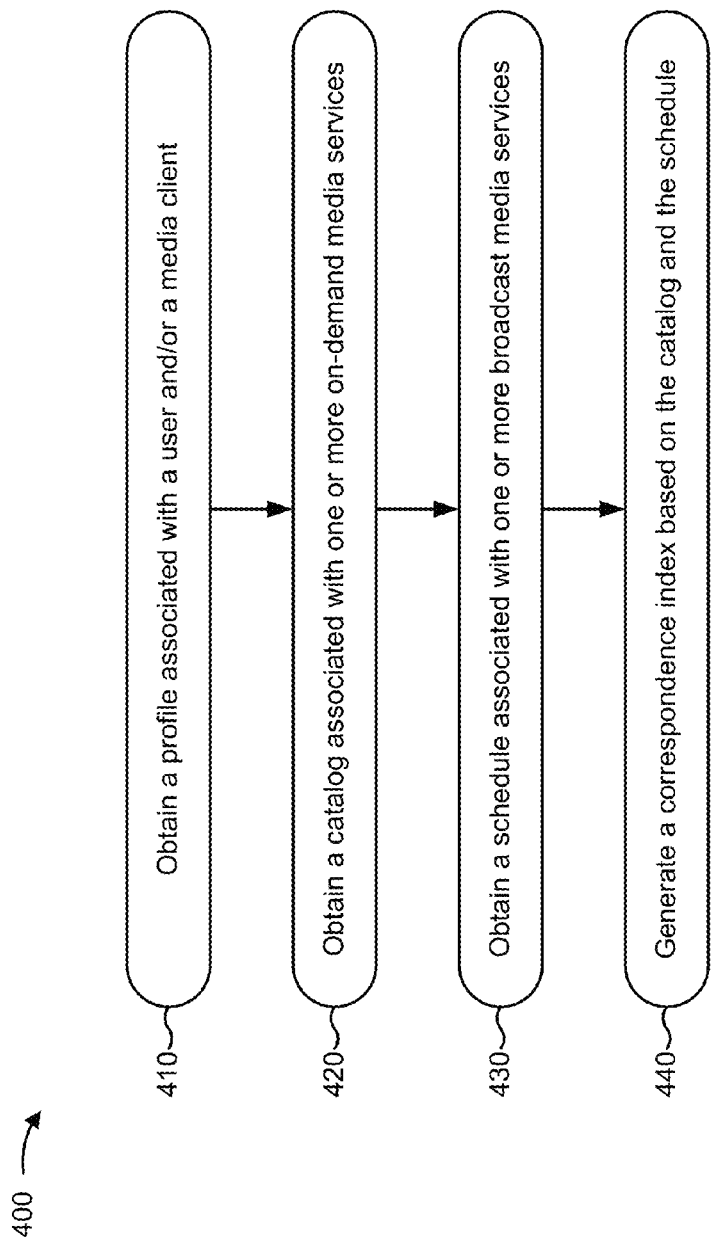
FIG. 4 is a flow chart of an example process for setting up a service for providing an on-demand suggestion for media content.

FIG. 4 is a flow chart of an example process 400 for setting up a service for providing an on-demand suggestion for media content. In some implementations, one or more process blocks of FIG. 4 may be performed by on-demand device 220. Additionally, or alternatively, one or more process blocks of FIG. 4 may be performed by another device or a group of devices separate from or including on-demand device 220, such as media client 210, schedule device 230, catalog device 240, and/or profile device 250.

As shown in FIG. 4, process 400 may include obtaining a profile associated with a user and/or a media client (block 410). For example, on-demand device 220 may receive the profile from profile device 250. The profile may identify on-demand and/or broadcast media services associated with the user and/or media client 210 (e.g., services for which the user has a subscription, entitlement, preference, or the like) and may further include credentials associated with the identified media services (e.g., a user identifier, password, token, and/or other authentication information). Alternatively, or additionally, the profile may identify one or more media clients 210 associated with the user.

The profile may identify conditions associated with one or more trigger events which prompt on-demand device 220 to provide media client 210 with available on-demand options. For example, a trigger event may correspond to media client 210 playing particular content from a position later than the beginning (i.e., starting late) and/or for a particular quantity of time. Additionally, or alternatively, a trigger event may correspond to media client 210 playing a particular portion of content (e.g., a commercial, opening credits, intermission, or the like). Additionally, or alternatively, a trigger event may correspond to media device 210 playing content whose quality satisfies a low-quality threshold (based on, e.g., resolution, bitrate, quantity of audio channels, or the like) and/or playing content for which a higher quality version is available on-demand. Additionally, or alternatively, a trigger event may correspond to the user switching from one media client 210 to another media client 210. These are simply examples of potential trigger events. Alternatively, or additionally, a trigger event may correspond to identifying a particular frame and/or a signature associated with a particular frame of media content played by media device 210, the frame signature being determined by passing the frame as input to a signature-generating function and/or device.

The profile may include preferences associated with the user and/or media client 210. The preferences may add, remove, or modify parameters associated with on-demand device 220's determination of a trigger event, identification of an on-demand option, or the like. Based on information included in the profile, on-demand device 220 may determine how and when to provide a suggestion for available on-demand options to media client 210.

As further shown in FIG. 4, process 400 may include obtaining a catalog associated with one or more on-demand media services (block 420). For example, on-demand device 220 may receive the catalog from catalog device 240. The catalog may include a list of on-demand media services and a list of media content associated with the identified on-demand media services. The list of on-demand media services may identify the on-demand media services identified in the user profile and/or the list of on-demand media services may identify other on-demand media services. The catalog may include information associated with the content/services identified in the catalog (e.g., quality, commercial interruptions, frame count, running length, prices, availability dates/times, etc.) and/or options for requesting on-demand media content from the on-demand media services (e.g., a URI/URL syntax). Based on the information included in the catalog, on-demand device 220 may identify available on-demand media content and how to play the on-demand media content using media client 210.

As further shown in FIG. 4, process 400 may include obtaining a schedule associated with one or more broadcast media services (block 430). For example, on-demand device 220 may receive the schedule from schedule device 230. The schedule may include a list of broadcast media services and a list of media content associated with the identified broadcast media services. For example, the list of broadcast media services may identify the same broadcast media services identified in the user profile and/or may identify other broadcast media services. The schedule may include information (e.g., quality, commercial interruptions, frame count, running length, prices, availability dates/times, etc.) associated with the media content/services identified in the schedule. Based on information included in the schedule, on-demand device 220 may identify broadcast media content played using media client 210.

As further shown in FIG. 4, process 400 may include generating a correspondence index based on the catalog and the schedule (block 440). For example, on-demand device 220 may generate the correspondence index based on the catalog and schedule. The correspondence index may include a list of available on-demand and/or broadcast media content and may identify on-demand and/or broadcast options for playing the media content identified in the list of available content. The correspondence index may include a time-frame correspondence index mapping a time position to frame position for a media content identified in the list. For example, the time-frame correspondence index may identify a frame position for a particular media content for a given broadcast time and/or elapsed stream time when the media content is interrupted by other content (e.g., a commercial). Alternatively, or additionally, the time-frame correspondence may include one or more frame signatures associated with identifying one or more frames of the particular media content. Based on the correspondence index, on-demand device 220 may identify, for example, broadcast media content, along with a frame position and on-demand option, based on a status received from media client 210, to provide media client 210 with a suggestion to seamlessly switch to on-demand media content associated with the on-demand option.

In this way, on-demand device 220 may set up a service for providing an on-demand suggestion for media content played by media device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of setting up a service for providing an on-demand suggestion for media content.

Figure 5A:
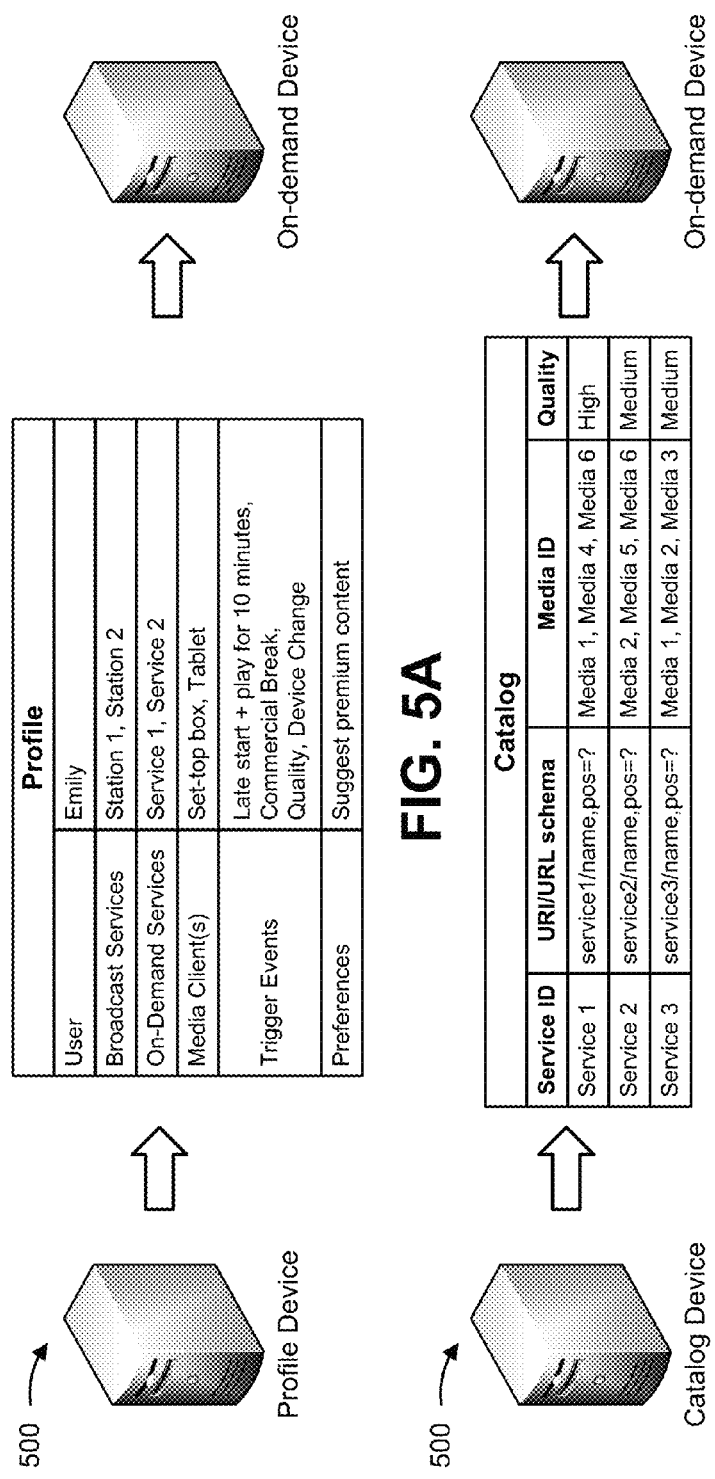

As shown in FIG. 5A, assume, for example implementation 500, that an on-demand device (e.g., on-demand device 220) sends a profile request to a profile device (e.g., profile device 250) requesting a profile associated with a user of a media client. Assume further that profile device 250 sends a profile response, including the requested profile. Assume further that the profile identifies the user ("Emily"), broadcast media services which are associated with the user ("Station 1" and "Station 2"); on-demand services associated with the user ("Service 1" and "Service 2"); media clients associated with the user ("Set-top box" and "Tablet"); trigger events associated with providing an on-demand suggestion to the user ("Late-start+play for 10 minutes,"

"Commercial break," "Quality," "Device Change"); and preferences associated with providing an on-demand suggestion to the user ("Suggest premium content"—e.g., suggest on-demand options which may not be identified in the list of on-demand services associated with the user and/or options which may incur an additional cost).

Figure 5B:
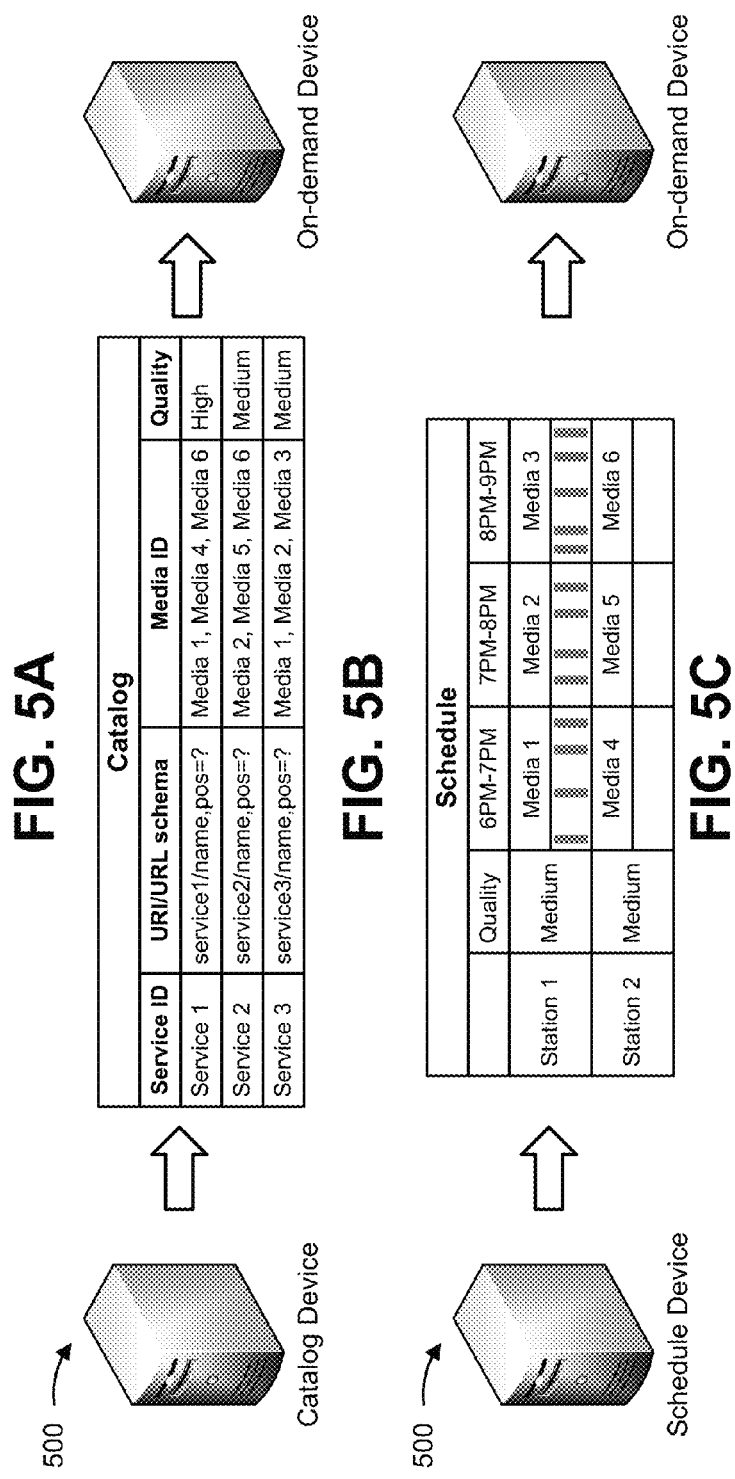

As shown in FIG. 5B, assume, for example implementation 500, that the on-demand device (e.g., on-demand device 220) sends a catalog request to a catalog device (e.g., catalog device 240) requesting a catalog associated with available on-demand media content. Assume further that catalog device 240 sends a catalog response, including the requested catalog. Assume further that the catalog identifies available on-demand media services ("Service 1," "Service 2," and "Service 3"); URI/URL schema associated with accessing media content at a particular frame position from the available on-demand media services ("service1/name,pos=?" for Service 1; "service2/name,pos=?" for Service 2; and "service3/name,pos=?" for Service 3); a list of available on-demand media content associated with each of the on-demand media services (Media 1, 4, and 6 from Service 1; Media 2, 5, and 6 from Service 2; and Media 1, 2, and 3 from Service 3); and quality information associated with the available on-demand media content/services (high quality media content from Service 1 and medium quality content from Service 2 and Service 3).

Figure 5C:
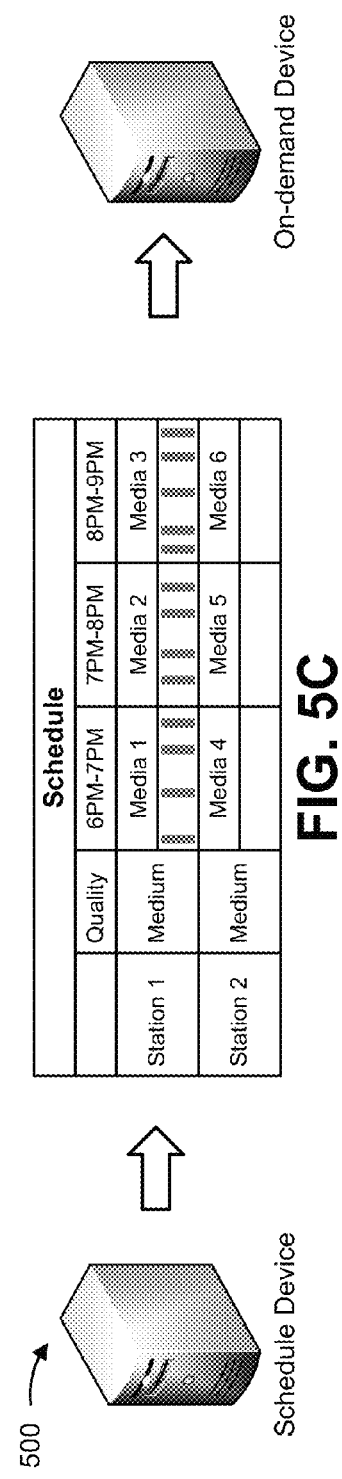

As shown in FIG. 5C, assume, for example implementation 500, that the on-demand device (e.g., on-demand device 220) sends a schedule request to a schedule device (e.g., schedule device 230) requesting a schedule associated with broadcast media content. Assume further that schedule device 230 sends a schedule response, including the requested schedule. Assume further that the schedule identifies available broadcast media services ("Station 1" and "Station 2"); quality associated with the broadcast media services ("Medium" for both Station 1 and Station 2); and broadcast times for broadcast media content associated with each of the broadcast media stations (for Station 1: Media 1 from 6 PM-7 PM, Media 2 from 7 PM-8 PM, and Media 3 from 8 PM-9 PM; and for Station 2: Media 4 from 6 PM-7 PM, Media 5 from 7 PM-8 PM, and Media 6 from 8 PM-9 PM). Assume that the schedule further identifies commercial interruption times associated with the broadcast media services (Station 1 commercials indicated by gray segments along the schedule; and Station 2 indicated as commercial-free).

Figure 5D:
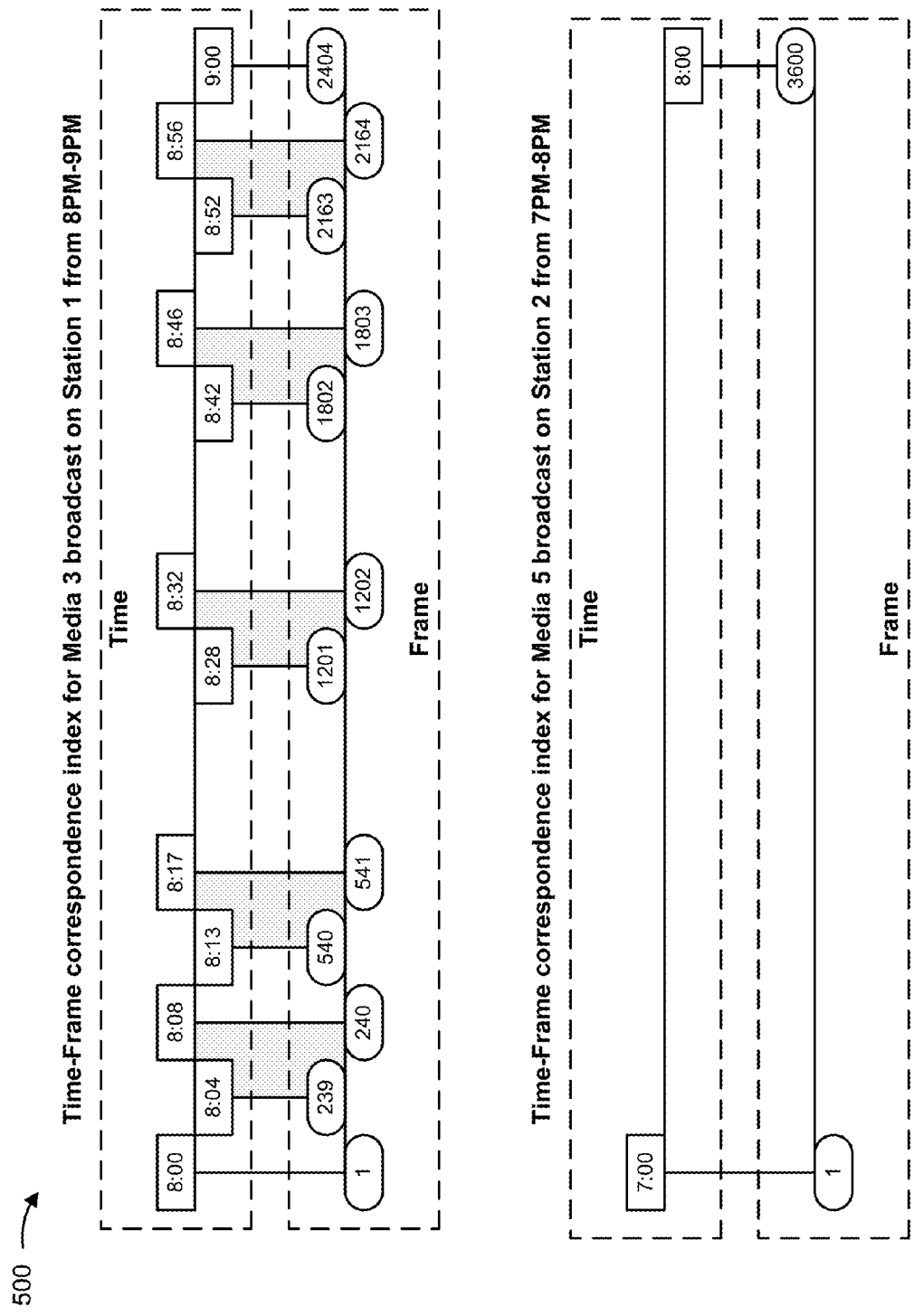

As shown in FIG. 5D, assume, for example implementation 500, that the on-demand device (e.g., on-demand device 220) further generates a time-frame correspondence index for media content identified in the catalog and/or schedule. For example, a time-frame correspondence index, associated with Station 1's broadcast of Media 3 from 8 PM to 9 PM, may indicate that Station 1 broadcasts frames 1 through 239 between 8:00 PM and 8:04 PM, frames 240 through 540 between 8:08 PM and 8:13 PM, frames 541 through 1201 between 8:17 PM and 8:28 PM, frames 1202 through 1802 between 8:32 PM and 8:42 PM, frames 1803 through 2163 between 8:46 PM and 8:52 PM, and frames 2164 through 2404 between 8:56 and 9:00 PM. The time-frame correspondence index associated with Station 1's broadcast of Media 3 may also indicate gaps corresponding to commercial breaks (shown as gray segments). Likewise, a time-frame correspondence index associated with Station 2's broadcast of Media 5 from 7 PM to 8 PM may indicate that Station 1 broadcasts frames 1 through 3600 continuously (e.g., without commercial interruption) from 7:00 PM until 8:00 PM. On-demand device 220 may likewise generate time-frame correspondence indices for other broadcast and/or on-demand media content which identifies a correspondence between play times and content frames for the other media content. Based on a time-frame correspondence index, on-demand device 220 may identify a frame position for media content based on a broadcast time.

As shown in FIG. 5E, assume, for example implementation 500, that the on-demand device (e.g., on-demand device 220) generates a correspondence index based on the information contained in the catalog, the schedule, and the time-frame correspondence indices. Assume further that the correspondence index includes a list of media content (e.g., Media 1 through Media 6) available from the on-demand services identified in the catalog as well as from the broadcast services identified in the schedule. Assume further that the correspondence index identifies, for each identified media content, the broadcast media services, broadcast times, time-frame correspondence indices, and content quality for each broadcast option associated with that media content. Assume further that the correspondence index identifies, for each identified media content, one or more on-demand services, URI/URLs, and content qualities associated with that media content. Based on the correspondence index, on-demand device 220 may identify and provide an on-demand suggestion which maintains a current position for media content.

As indicated above, FIGS. 5A-5E are provided merely as an example. Other examples are possible and may differ from what was described with regard to FIGS. 5A-5E.

Figure 6:
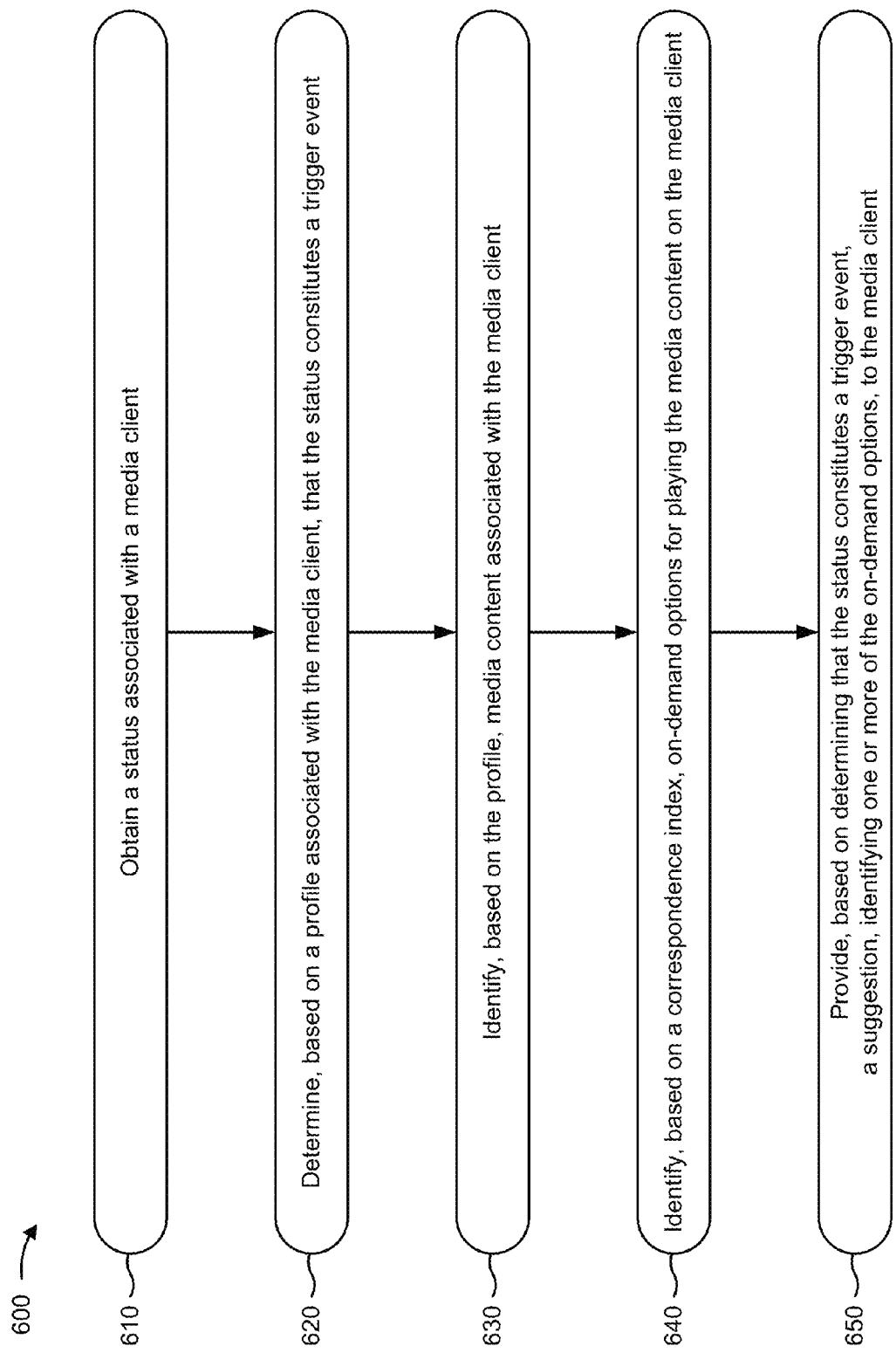
FIG. 6 is a flow chart of an example process for operating a service for providing an on-demand suggestion for media content.

FIG. 6 is a flow chart of an example process 600 for operating a service for providing an on-demand suggestion for media content. In some implementations, one or more process blocks of FIG. 6 may be performed by on-demand device 220. In some implementations, one or more process blocks of FIG. 6 may be performed by another device or a group of devices separate from or including on-demand device 220, such as media client 210, schedule device 230, catalog device 240, and/or profile device 250.

As shown in FIG. 6, process 600 may include obtaining a status associated with a media client (block 610). For example, on-demand device 220 may receive the status from media client 210 based on a schedule or condition associated with media client 210. The status may include information for identifying media client 210 and/or a user of media client 210 (e.g., a user identifier, media client identifier, customer identifier, or the like). Additionally, or alternatively, the status may include information for identifying media content played by the user and/or media client 210 (e.g., a media service identifier, a time stamp, a media content identifier, a frame, a frame signature, etc.). Based on the status, on-demand device 220 may identify the user and/or media client 210 as well as the media content/position for which to provide an on-demand suggestion.

As further shown in FIG. 6, process 600 may include determining, based on a profile associated with the media client, that the status constitutes a trigger event (block 620). For example, on-demand device may identify, based on information included in the status, a profile associated with the user and/or media client 210 which includes conditions associated with one or more trigger events. Examples of trigger events are described above with respect to block 410 of FIG. 4 and example implementation 500 of FIG. 5A. Alternatively, or additionally, the profile may add, remove, and/or modify, for the user, conditions associated with one or more trigger events defined in other configuration information (e.g., a global and/or default profile) associated with one or more other users of on-demand device 210.

On-demand device 220 may determine, e.g., based on comparing a time stamp, frame, and/or a frame signature included in the status to a schedule, catalog, and/or correspondence index, that media client 210 is (and/or was) playing particular content from a particular position (e.g., beginning, frame position, opening credits, commercial break, intermission, or the like). Additionally, or alternatively, on-demand device 220 may compare two or more statuses to determine how long media client 210 has played particular content or to determine whether the user has switched from one media client 210 to another media client 210. Additionally, or alternatively, on-demand device 220 may, based on information included in the schedule, catalog, and/or correspondence index, identify a quality of media content associated with the status. Additionally, or alternatively, on-demand device 220 may identify information in the status which explicitly directs on-demand device 220 to provide an on-demand suggestion. In this way, on-demand device 220 may determine when to provide an on-demand suggestion to media client 210.

As further shown in FIG. 6, process 600 may include identifying, based on the profile, media content associated with the media client (block 630). On-demand device 220 may identify the media content based on the received status and/or a previously received status. For example, on-demand device 220 may identify media content based on looking up, in the schedule and/or correspondence index, a broadcast media service and a time/frame identified in the status. As another example, the status may explicitly identify media content using, e.g., a media content identifier.

As further shown in FIG. 6, process 600 may include identifying, based on a correspondence index, on-demand options for playing the media content on the media client (block 640). For example, on-demand device 220 may identify the on-demand options by looking up, in the correspondence index, catalog, and/or schedule, the media content associated with the status. On-demand device 220 may look up the media content based on identifying a media content identifier, a time stamp, a frame, a broadcast content service, and/or an on-demand content service associated with the status. For example, on-demand device 220 may use the correspondence index to identify on-demand options, for the media content, based on a broadcast media service and time/frame identified in the status and/or identified in a previous status. Alternatively, or additionally, on-demand device 220 may compare a frame and/or frame signature received from media client 210 to a corresponding frame and/or frame signature associated with the media content in order to determine a position associated with media client 210's playing of the media content.

As further shown in FIG. 6, process 600 may include providing, based on determining that the status constitutes a trigger event, a suggestion, identifying one or more of the on-demand options, to the media client (block 650). For example, on-demand device 220 may select one or more of the identified on-demand option(s) and provide, to media client 210, a response identifying the selected on-demand option(s). On-demand device 220 may select an on-demand option based on, e.g., information associated with the on-demand option, information contained in a status, and/or information contained in a profile associated with media client 210. For example, on-demand device 220 may select and provide an on-demand option based on content quality (e.g., relative to content identified in the status and/or other on-demand options), based on a service identified in the profile (e.g., for which the user and/or media client 210 has a subscription), based on an interruption (e.g., providing a commercial-free option), based on a device identifier (e.g., playable on media client 210), or the like. In this way, on-demand device 220 may provide an on-demand option, from the available on-demand options, which may be desired by a user of media client 210.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of example implementations 700 through 740 relating to example process 600 shown in FIG. 6. FIGS. 7A-7E show an example of operating a service for providing an on-demand suggestion for media content. Assume, for example implementations 700 through 740, that a service for providing an on-demand suggestion for media content has been set up according to example implementation 500, described above.

Figure 7A:
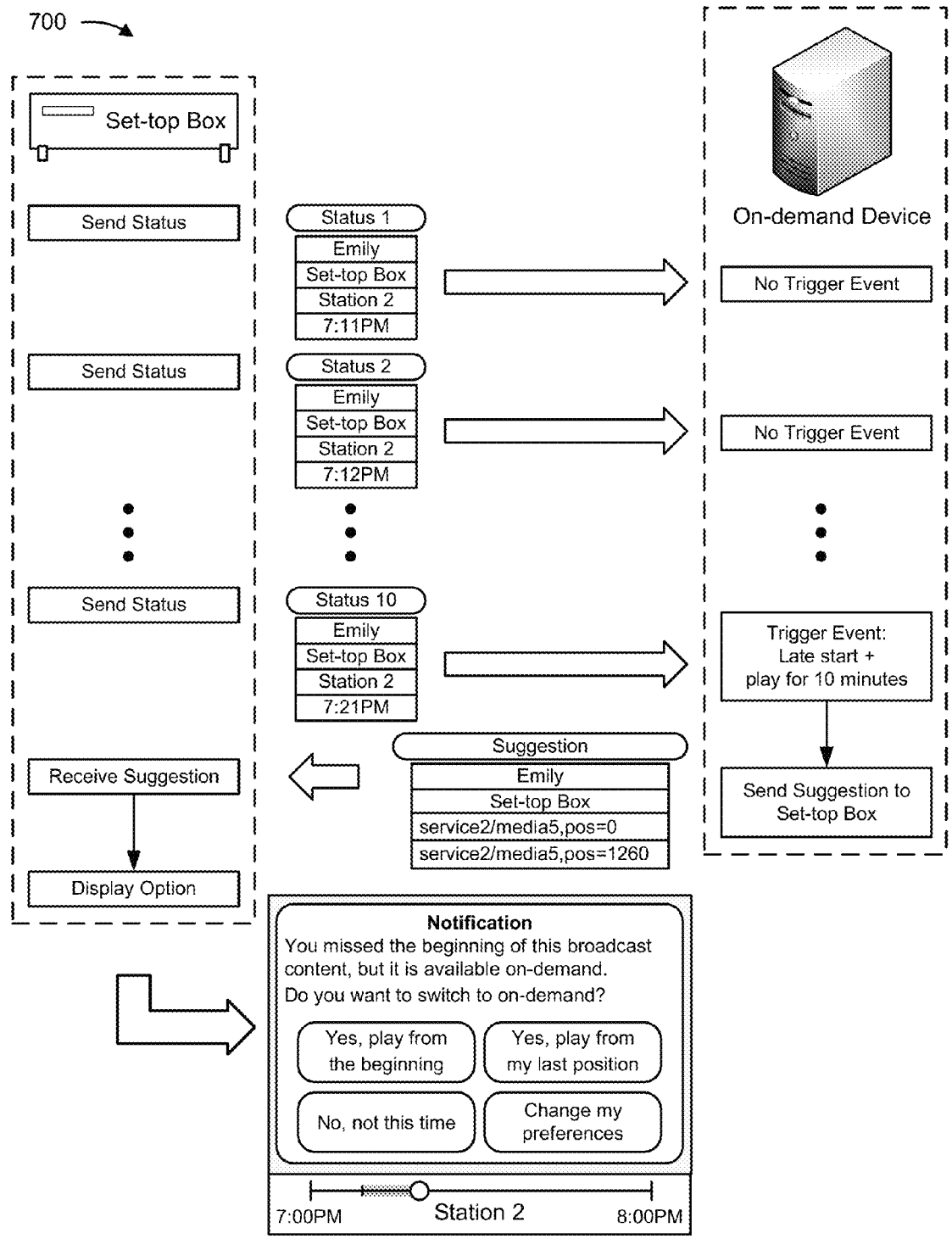
FIGS. 7A-7E are diagrams of example implementations relating to the example process shown in FIG. 6.

As shown in FIG. 7A, assume, for example implementation 700, that a user directs a set-top box media client (e.g., media client 210) to play broadcast content from Station 2 at 7:11 PM. Assume further that the set-top box sends, to an on-demand device (e.g., on-demand device 220), a first status ("Status 1"), identifying the user ("Emily"), the media client ("Set-top box"), the broadcast media service ("Station 2"), and the time ("7:11 PM"). Based on comparing the first status ("Status 1") to information contained in the schedule and/or correspondence index, on-demand device 220 may determine that the set-top box began playing Media 5 from a position later than the beginning ("Late start"). Based on trigger event conditions included in the profile associated with user Emily and/or media client Set-top box, on-demand device 220 may determine that the first status does not constitute a trigger event.

Assume that the set-top box continues to play Station 2 for ten minutes (as shown by a progress bar) and sends periodic (at 1 minute intervals) statuses to on-demand device 220. Based on subsequent statuses up to and/or including a tenth status ("Status 10"), on-demand device 220 may determine that the set-top box has played Station 2 for a period of ten minutes. Based on the trigger event conditions included in the profile associated with user Emily and/or set-top box, on-demand device 220 may determine that the tenth status constitutes a trigger event ("Late start+play for 10 minutes"). Based on the correspondence index, on-demand device 220 may identify media content ("Media 5") and frame position (frame 1260") associated with the tenth status and provide an on-demand suggestion ("Suggestion"), to the set-top box associated with user Emily, identifying URI/URL options for restarting and/or resuming Media 5 from service 2 ("service2/media5,pos=0" and "service2/media5, pos=1260," respectively).

Based on receiving the suggestion from on-demand device 220, the set-top box may display, to a user (e.g., Emily), a notification indicating that a trigger condition has been met ("You missed the beginning of the broadcast content") and that the content is available on-demand. The notification may further provide the user with options, based on the on-demand options identified in the suggestion, which might be desirable for playing the broadcast content from Station 2 ("Do you want to switch to on-demand? Yes, play from the beginning" or "Yes, play from my last position"). The notification may further provide the user with an option to continue playing the broadcast from Station 2 ("No, not this time") and/or to modify trigger event conditions associated with the user Emily and/or the media client Set-top box ("Change my preferences"). In this way, on-demand device 220 may notify the user that content playing from broadcast Station 2 is available on-demand from Service 2 and may further assist the user in switching from broadcast Station 2 to on-demand Service 2.

Figure 7B:
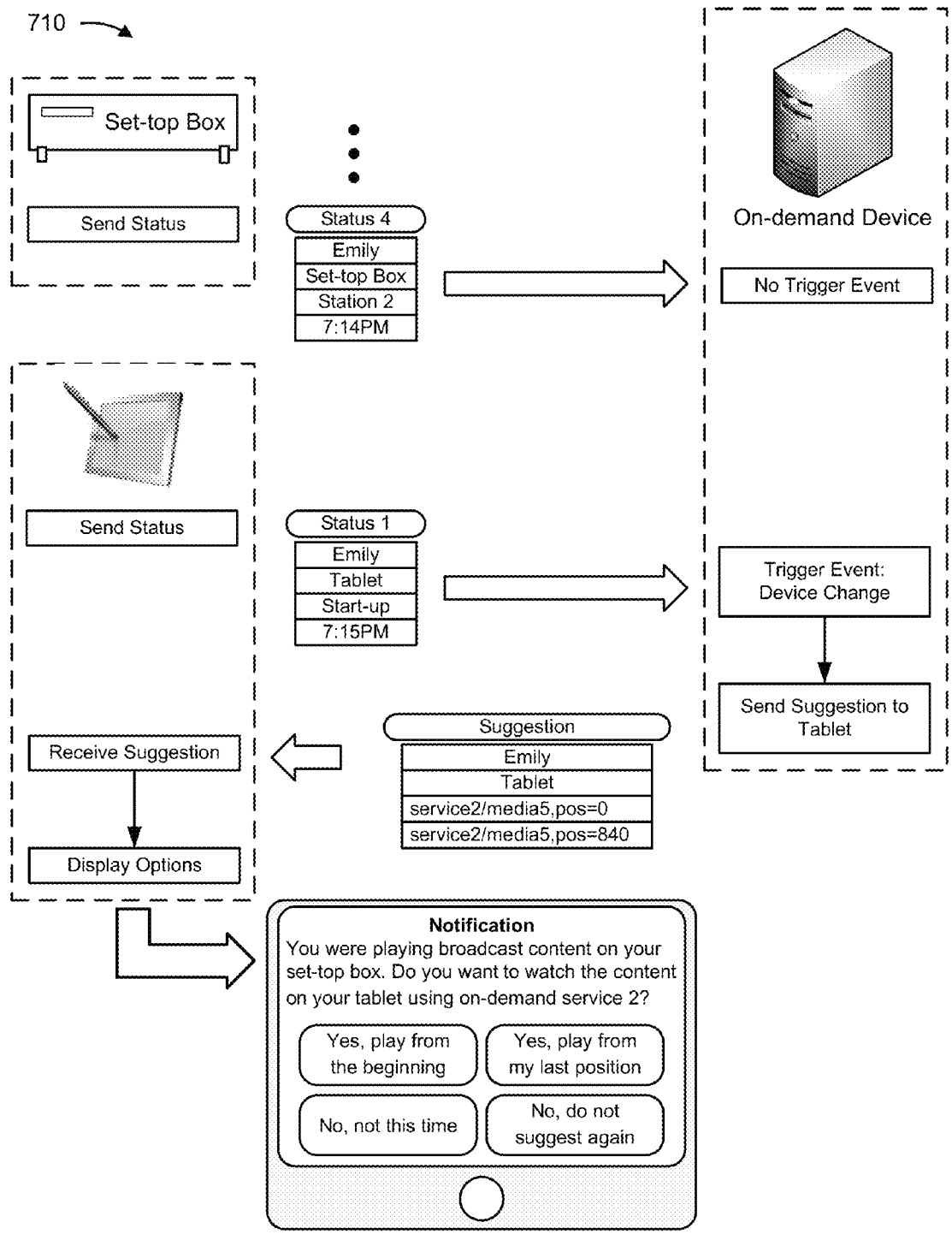

As shown in FIG. 7B, assume, for example implementation 710, that, as in example implementation 700, a user directs a set-top box media client (e.g., media client 210) to play broadcast content from Station 2 at 7:11 PM. As in example implementation 700, assume further that the set-top box sends, to an on-demand device (e.g., on-demand device 220), a series of periodic statuses (at 1 minute intervals) including a fourth status ("Status 4"), identifying the user ("Emily"), the media client ("Set-top box"), the broadcast media service ("Station 2"), and the time ("7:14 PM"). Based on the trigger event conditions included in the profile associated with user Emily and/or media client Set-top box, on-demand device 220 may determine that the fourth status does not constitute a trigger event.

Assume that the user initializes (e.g., turns on and/or accesses a media client application) a tablet media client (e.g., media client 210). Assume that the tablet sends, to on demand device 220, a first status identifying the user ("Emily"), the media client ("Tablet"), the initialization ("Start-up"), and the time ("7:15 PM"). Based on the tablet's first status, on-demand device 220 may determine that the user has switched from the set-top box to the tablet. Based on the trigger event conditions included in the profile associated with user Emily and/or media client Set-top box, on-demand device 220 may determine that the tablet's first status constitutes a trigger event ("Device Change"). Based on the correspondence index, on-demand device 220 may identify media content ("Media 5") and frame position ("840") associated with the set-top box's fourth status and provide an on-demand suggestion ("Suggestion"), to the tablet associated with user Emily, identifying URI/URL options for restarting and/or resuming Media 5 from service 2 ("service2/media5,pos=0" and "service2/media5,pos=840," respectively).

Based on receiving the suggestion from on-demand device 220, the tablet may display, to the user, a notification indicating that a trigger condition has been met ("You were playing broadcast content on your set-top box") and that the content is available on-demand. The notification may further provide the user with options, based on the on-demand options identified in the suggestion, to play the content using the tablet ("Do you want to watch the content on your tablet using on-demand service 2? Yes, play from the beginning" or "Yes, play from my last position"). The notification may further provide the user with an option to not play the content ("No, not this time") and/or to modify trigger event conditions associated with the user Emily and/or the media client tablet ("Do not suggest again"). In this way, on-demand device 220 may notify the user that content played on a first media client is available on-demand on a second media client and may further assist the user in watching the content when the user switches from the first media client (the set-top box) to the second media client (the tablet).

Figure 7C:
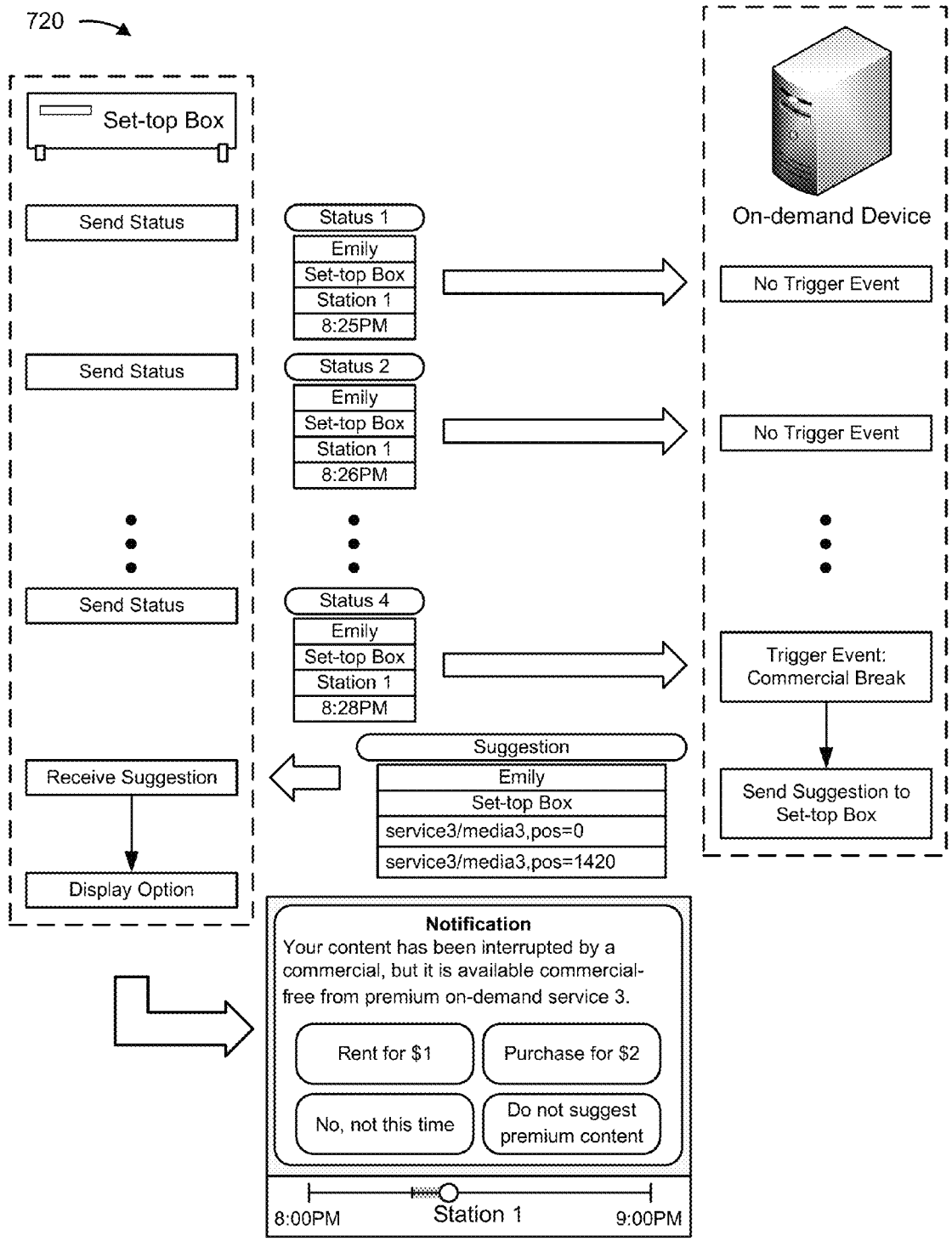

As shown in FIG. 7C, assume, for example implementation 720, that a user directs a set-top box media client (e.g., media client 210) to play broadcast content from Station 1 at 8:25 PM. Assume further that the set-top box sends, to an on-demand device (e.g., on-demand device 220), a first status ("Status 1"), identifying the user ("Emily"), the media client ("Set-top box"), the broadcast media service ("Station 1"), and the time ("8:25 PM"). Based on the trigger event conditions included in the profile associated with user Emily and/or media client Set-top box, on-demand device 220 may determine that the first status does not constitute a trigger event.

Assume that the set-top box continues to play Station 1 and send periodic (at 1 minute intervals) statuses to on-demand device 220. Based on a fourth status ("Status 4") and information contained in the correspondence index, on-demand device 220 may determine that the set-top box is playing a commercial interruption. Based on trigger event conditions included in the profile associated with user Emily and/or media client Set-top box, on-demand device 220 may determine that the fourth status constitutes a trigger event ("Commercial Break"). Based on the correspondence index, on-demand device 220 may identify media content ("Media 3") and frame position ("frame 1420") associated with the fourth status as well as an on-demand option ("Service 3") for playing the content. Although the profile associated with user Emily may not identify Service 3 as a preferred service provider, based on information contained in the preferences ("Suggest premium content"), on-demand device 220 may provide an on-demand suggestion ("Suggestion"), to the set-top box associated with user Emily, identifying URI/URL options for restarting and/or resuming Media 3 from service 3 ("service3/media3,pos=0" and "service3/media3, pos=1420," respectively).

Based on receiving the suggestion from on-demand device 220, the set-top box may display, to a user (e.g., Emily), a notification indicating that a trigger condition has been met ("Your content has been interrupted by a commercial") and that the content is available on-demand from a premium service. The notification may further provide the user with options, based on the on-demand options identified in the suggestion, which might be desirable for playing the broadcast content from Station 1 ("Rent for $1" or "Purchase for $2"). The notification may further provide the user with an option to continue playing the broadcast from Station 2 ("No, not this time") and/or to modify trigger event conditions associated with the user Emily and/or the media client Set-top box ("Do not suggest premium content"). In this way, on-demand device 220 may notify the user that content playing from broadcast Station 1 is available on-demand from Service 3 and may further assist the user in switching from broadcast Station 1 to on-demand Service 3.

Figure 7D:
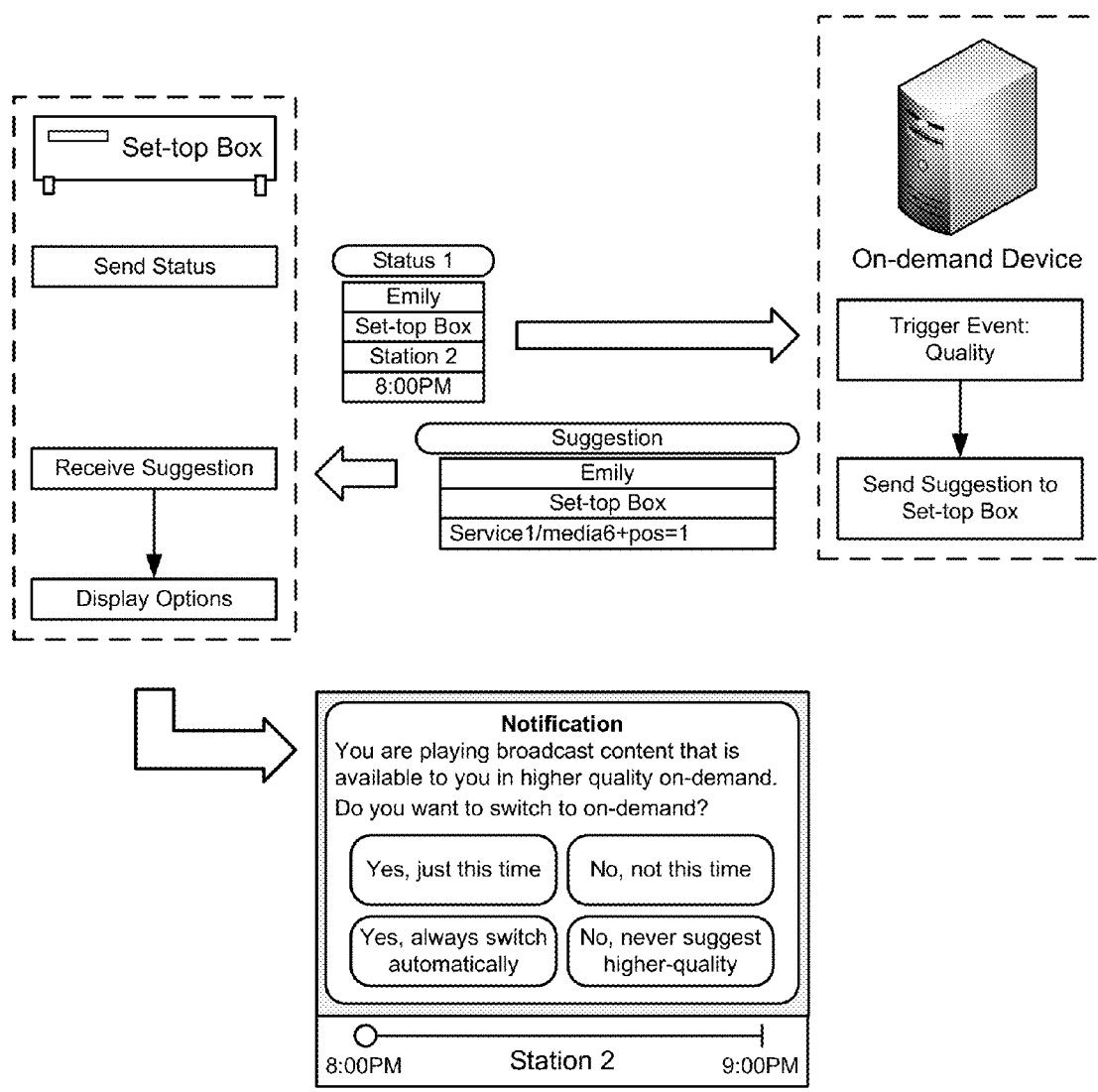

As shown in FIG. 7D, assume, for example implementation 730, that a user directs a set-top box media client (e.g., media client 210) to play broadcast content from Station 2 at 8:00 PM. Assume further that the set-top box sends, to an on-demand device (e.g., on-demand device 220), a first status ("Status 1"), identifying the user ("Emily"), the media client ("Set-top box"), the broadcast media service ("Station 2"), and the time ("8:00 PM"). Based on the correspondence index, on-demand device 220 may determine that Station 2 is broadcasting Media 6 in medium quality and that Media 6 is available in high quality from on-demand Service 1.

Based on trigger event conditions included in the profile associated with user Emily and/or media client Set-top box, on-demand device 220 may determine that the first status constitutes a trigger event ("Quality"). On-demand device 220 may provide an on-demand suggestion ("Suggestion"), to the set-top box associated with user Emily, identifying an URI/URL option for playing Media 6 in higher quality from Service 1 ("service1/media6,pos=0").

Based on receiving the suggestion from on-demand device 220, the set-top box may display, to a user (e.g., Emily), a notification indicating that a trigger condition has been met ("You are playing broadcast content that is available to you in higher quality on-demand.") and that the content is available on-demand. The notification may further provide the user with an option to play Media 6 from service 1 ("Yes, just this time") or to continue playing from Station 2 ("No, not this time") without modifying the profile associated with the user Emily. The notification may further provide the user with options to play Media 6 from Service 1 and to modify the profile to direct the set-top box and/or other media clients associated with the user Emily to automatically switch, rather than provide a notification ("Yes, always switch automatically"). The notification may further provide the user with an option to continue playing from Station 2 and to modify the profile to disable the Quality trigger event ("No, never suggest higher-quality"). In this way, on-demand device 220 may notify the user that content playing from broadcast Station 2 is available in higher quality on-demand from Service 1 and may further assist the user in switching from broadcast Station 2 to on-demand Service 1.

Figure 7E:
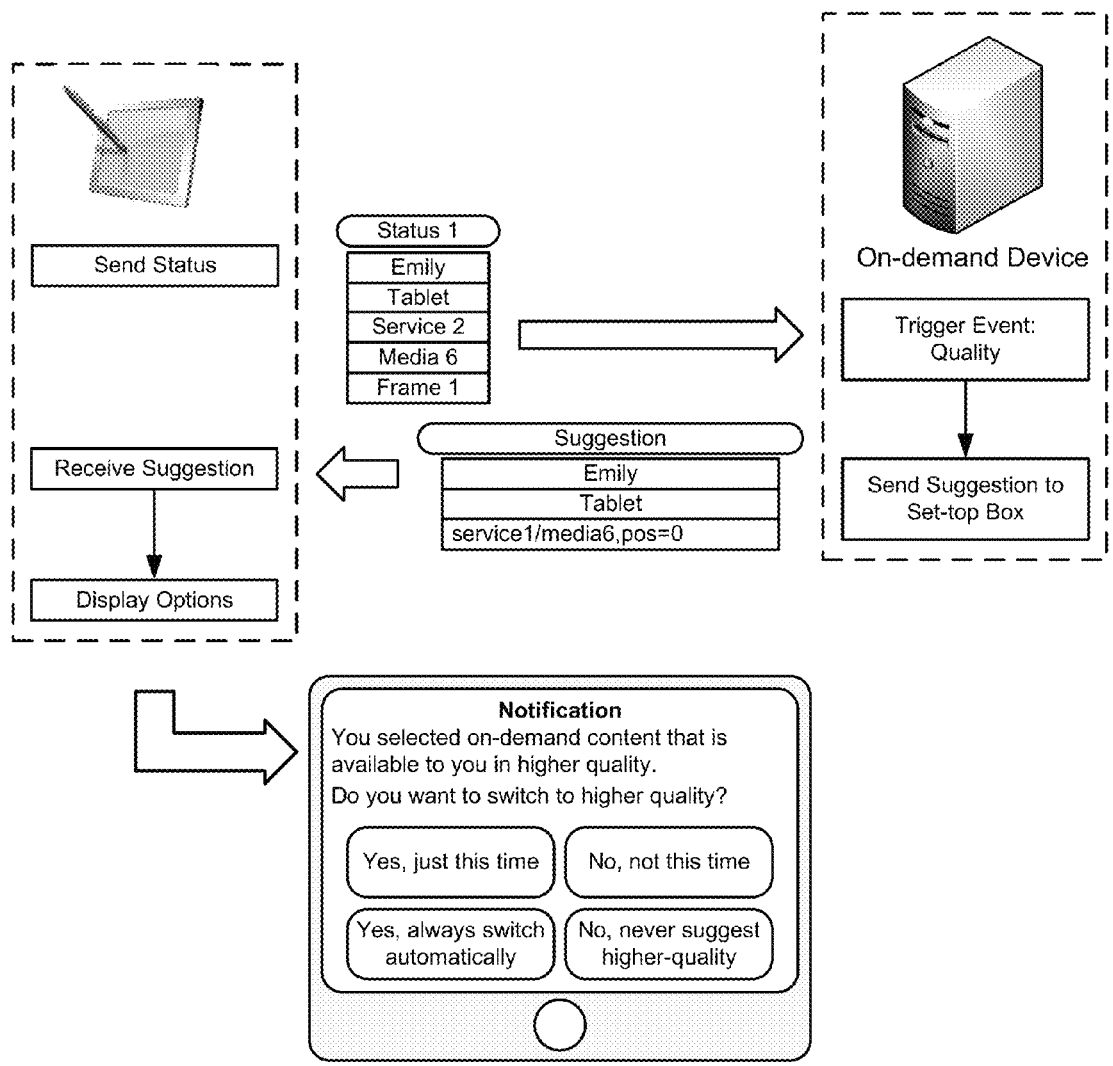

As shown in FIG. 7E, assume, for example implementation 740, that a user directs a tablet media client (e.g., media client 210) to play on-demand content ("Media 6") from Service 2. Assume further that the tablet sends, to an on-demand device (e.g., on-demand device 220), a first status ("Status 1"), identifying the user ("Emily"), the media client ("Tablet"), the on-demand media service ("Service 2"), the media content ("Media 6"), and the frame position ("Frame 1"). Based on the correspondence index, on-demand device 220 may determine that Service 2 streams Media 6 in medium quality and that Media 6 is available in high quality from on-demand Service 1.

Based on trigger event conditions included in the profile associated with user Emily and/or media client tablet, on-demand device 220 may determine that the first status constitutes a trigger event ("Quality"). On-demand device 220 may provide an on-demand suggestion ("Suggestion"), to the tablet associated with user Emily, identifying an URI/URL option for playing Media 6 in higher quality from Service 1 ("service1/media6,pos=0").

Based on receiving the suggestion from on-demand device 220, the tablet may display, to a user (e.g., Emily), a notification indicating that a trigger condition has been met and that the content is available in higher quality on-demand ("You selected on-demand content that is available to you in higher quality"). The notification may further provide the user with options to play Media 6 from service 1 ("Yes, just this time") or to continue playing from Service 2 ("No, not this time") without modifying the profile associated with the user Emily. The notification may further provide the user with an option to play Media 6 from Service 1 and to modify the profile to direct the tablet and/or other media clients associated with the user Emily to automatically switch, rather than provide a notification ("Yes, always switch automatically"). The notification may further provide the user with an option to continue playing from Service 2 and to modify the profile to disable the Quality trigger event ("No, never suggest higher-quality"). In this way, on-demand device 220 may notify the user that content playing from on-demand Service 2 is available in higher quality from on-demand Service 1 and may further assist the user in switching from on-demand Service 2 to on-demand Service 1.

As indicated above, FIGS. 7A-7E are provided merely as examples. Other examples are possible and may differ from what was described with regard to FIGS. 7A-7E.

Implementations described herein may assist a user of a media client in playing media content associated with the user and/or media client from an on-demand service.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory to store instructions; and
one or more processors, to execute the instructions in memory, to:
obtain an on-demand catalog associated with an on-demand media service;
obtain a broadcast schedule associated with a broadcast media service;
obtain a status associated with a media client,
the status including information identifying:
the media client,
a user of the media client, and
a media content being played by the media client using the broadcast media service;
identify, based on the status and included in the broadcast schedule, the media content being played by the media client using the broadcast media service;
identify, from additional information included in the on-demand catalog, an on-demand option for playing the media content using the on-demand media service;
obtain another status, associated with another media client, identifying initialization of a media client application by the other media client,
the other media client being associated with the user of the media client, and the other status including information identifying:
the other media client,
the user, and
a time associated with initialization of the media client application;
determine, based on the status and the other status, that the user has initialized the other media client during playback of the media content by the media client using the broadcast media service,
the other media client being initialized, during playback of the media content by the media client using the broadcast media service, satisfying a trigger event; and
provide, to the other media client, a suggestion identifying the on-demand option, based on determining that that the user has initialized the other media client during playback of the media content by the media client using the broadcast media service,
the on-demand option permitting the user, of the other media client, to play the media content using the on-demand media service.

2. The device of claim 1, where the one or more processors are further to:
identify, based on the other status, a broadcast time associated with the media content;
identify, based on the broadcast time and the information included in the broadcast schedule, a frame position associated with the media content; and
provide the suggestion to the other media client after identifying the frame position,
the on-demand option permitting the user to play the media content, based on the frame position, using the on-demand media service.

3. The device of claim 1, where the one or more processors are further to:
generate a correspondence index based on the on-demand catalog and the broadcast schedule,
the correspondence index identifying, based on the information included in the broadcast schedule, one or more media content and one or more broadcast times associated with the one or more media content,
the correspondence index further identifying, based on the additional information included in the on-demand catalog, one or more on-demand options associated with the one or more media content; and
identify, based on the other status, a broadcast time associated with the other status; and
when identifying the media content and the on-demand option, the one or more processors are to:
identify the media content and the on-demand option based on the broadcast time and the correspondence index.

4. The device of claim 1, where the one or more processors are further to:
obtain a third status associated with the other media client; and
determine, based on comparing information included in the other status with information included in the third status, that a trigger condition has been met; and
when providing the suggestion to the other media client, the one or more processors are to:
provide, to the other media client, the suggestion identifying the on-demand option based on determining that the trigger condition has been met.

5. The device of claim 4, where the one or more processors are further to:
identify, based on the other status, a broadcast time associated with the media content; and
identify, based on the third status, another broadcast time associated with the media content; and
when determining that the trigger condition has been met, the one or more processors are to:
determine that the trigger condition has been met based on comparing the broadcast time and the other broadcast time.

6. The device of claim 1, where the one or more processors are further to:
determine, based on information included in the other status and the information included in the broadcast schedule, that the other status is associated with an interruption in the media content; and
when providing the suggestion identifying the on-demand option, the one or more processors are to:
provide the suggestion to the other media client based on determining that the other status is associated with the interruption.

7. The device of claim 1, where the one or more processors are further to:
determine, based on information included in the other status and the information included in the broadcast schedule, that the other status is associated with the other media client starting the media content from a position later than a beginning of the media content; and when providing the suggestion identifying the on-demand option, the one or more processors are to:
provide the suggestion to the other media client based on determining that the other status is associated with the other media client starting the media content from the position later than the beginning of the media content.

8. A non-transitory computer-readable medium storing instructions, the instructions comprising:
one or more instructions that, when executed by one or more processors, cause the one or more processors to:
obtain an on-demand catalog,
the on-demand catalog including a list of media content associated with
one or more on-demand media services;
obtain a status associated with a media client,
the status being associated with a media content being played by the media client, and
the status including information identifying:
the media client,
a user of the media client, and
the media content being played by the media client using a broadcast media service;
obtain another status, associated with another media client, identifying initialization of a media client application by the other media client,
the other media client being associated with the user of the media client, and
the other status including information identifying:
the other media client,
the user, and
a time associated with initialization of the media client application;
determine, based on the status and the other status, that the user has initialized the other media client during playback of the media content by the media client using the broadcast media service,
the other media client being initialized, during playback of the media content by the media client using the broadcast media service, satisfying a trigger event;
determine whether the media content is identified in the list of media content included in the on-demand catalog; and
provide, based on determining that the media content is identified in the list of media content included in the on-demand catalog and based on determining that the user has initialized the other media client during playback of the media content by the media client, a suggestion to the other media client,
the suggestion identifying the media content and further identifying an on-demand media service, from the one or more on-demand media services, for providing the media content to the other media client.

9. The non-transitory computer-readable medium of claim 8, where the instructions further comprise:
one or more instructions that, when executed by the one or more processors, cause the one or more processors to:
obtain a broadcast schedule associated with one or more broadcast media services; and
the one or more instructions that cause the one or more processors to determine whether the media content is identified in the list of media content included in the on-demand catalog, cause the one or more processors to:
identify the media content based on comparing information included in the other status to information included in the broadcast schedule.

10. The non-transitory computer-readable medium of claim 8, where the instructions further comprise:
one or more instructions that, when executed by the one or more processors, cause the one or more processors to:
determine a quality level associated with the media content available from the on-demand media service; and
the one or more instructions that, that cause the one or more processors to provide the suggestion to the other media client, cause the one or more processors to:
provide the suggestion to the other media client based on the quality level.

11. The non-transitory computer-readable medium of claim 8, where the instructions further comprise:
one or more instructions that, when executed by the one or more processors, cause the one or more processors to:
determine, based on a time associated with the other status, a frame position for the media content; and
the one or more instructions that, that cause the one or more processors to provide the suggestion to the other media client, cause the one or more processors to:
provide, to the other media client, the suggestion for accessing the media content from the on-demand service starting at the frame position.

12. The non-transitory computer-readable medium of claim 8, where the instructions further comprise:
one or more instructions that, when executed by the one or more processors, cause the one or more processors to:
identify, based on the other status, a profile associated with the user of the other media client; and
the one or more instructions that, that cause the one or more processors to provide the suggestion to the other media client, cause the one or more processors to:
provide the suggestion to the other media client based on information included in the profile.

13. The non-transitory computer-readable medium of claim 8, where the instructions further comprise:
one or more instructions that, when executed by the one or more processors, cause the one or more processors to:
obtain a broadcast schedule associated with one or more broadcast media services;
generate a correspondence index, based on the on-demand catalog and the broadcast schedule,
the correspondence index identifying, based on information included in the broadcast schedule, one or more broadcast times and one or more broadcast media services associated with one or more broadcast media content,
the correspondence index further identifying, based on the list of media content included in the on-demand catalog, one or more on-demand services for providing some or all of the one or more broadcast media content; and identify, based on information included in the other status, a broadcast time associated with the other status; and the one or more instructions that, that cause the one or more processors to determine whether the media content is identified in the list of media content included in the on-demand catalog, cause the one or more processors to:

determine whether the media content is identified in the list of media content included in the on-demand catalog based on the broadcast time and the correspondence index.

14. A method, comprising:

obtaining, by a device, an on-demand catalog, the on-demand catalog including a list of on-demand media services and a list of media content provided by the on-demand media services;

obtaining, by the device and from a media client, a status associated with a media content, the media content being played by the media client using a broadcast media service, and the status including information identifying:
the media client,
a user of the media client, and
the media content;

obtaining, by the device and from another media client, another status, associated with the other media client, identifying initialization of a media client application by the other media client, the other media client being associated with the user of the media client, and the other status including information identifying:
the other media client,
the user, and
a time associated with initialization of the media client application;

determining, by the device and based on the status and the other status, that the user has initialized the other media client during playback of the media content by the media client using the broadcast media service, the other media client being initialized, during playback of the media content by the media client using the broadcast media service, satisfying a trigger event;

identifying, by the device, an on-demand media service, from the list of on-demand media services, from which the media content is available to the other media client; and providing, by the device and to the other media client, a suggestion identifying the media content that is available to the other media client via the on-demand media service, the suggestion being provided to the other media client based on determining that the user has initialized the other media client during playback of the media content by the media client using the broadcast media service.

15. The method of claim 14, further comprising:

identifying a time associated with the other status; and identifying the media content based on comparing the time and one or more broadcast times from a broadcast schedule associated with the broadcast media service.

16. The method of claim 15, further comprising:

identifying, based on the time and the one or more broadcast times, a progress associated with playing the media content on the other media client; and identifying the progress in the suggestion.

17. The method of claim 14, further comprising:

identifying a list of conditions associated with providing the suggestion; and determining whether the other status is associated with satisfying one or more conditions identified in the list of conditions; and when providing the suggestion to the other media client, the method comprises:

providing the suggestion to the other media client based on determining that the other status is associated with satisfying one or more conditions identified in the list of conditions.

18. The method of claim 17, further comprising:

identifying a condition, from the list of conditions, associated with the other media client playing the media content for a particular length of time; and determining, based on the other status, whether the other media client has played the media content for the particular length of time.

19. The method of claim 17, further comprising:

identifying a condition, from the list of conditions, associated with the other media client starting to play the media content from a position later than a beginning of the media content; and determining, based on the other status, whether the other media client has started to play the media content from the position later than the beginning.

20. The method of claim 14, further comprising:

receiving, from the other media client, an input; and providing, to the other media client and based on receiving the input, media content from the on-demand media service.

* * * * *